K. TROWBRIDGE.
PLANETARY GEARING.
APPLICATION FILED AUG. 5, 1910.

1,037,808.

Patented Sept. 3, 1912.

2 SHEETS—SHEET 1.

Witnesses
Edwin G. McKee
V. B. Hillyard

Inventor
Kenneth Trowbridge

By Victor J. Evans
Attorney

K. TROWBRIDGE.
PLANETARY GEARING.
APPLICATION FILED AUG. 5, 1910.

1,037,808.

Patented Sept. 3, 1912.
2 SHEETS—SHEET 2.

Witnesses
Edwin G. McKee
V. B. Hillyard.

Inventor
Kenneth Trowbridge
By Victor J. Evans
Attorney

BEST AVAILABLE COPY

UNITED STATES PATENT OFFICE.

KENNETH TROWBRIDGE, OF ATLANTA, GEORGIA.

PLANETARY GEARING.

1,037,808.  Specification of Letters Patent.  Patented Sept. 3, 1912.

Application filed August 5, 1910. Serial No. 575,681.

*To all whom it may concern:*

Be it known that I, KENNETH TROWBRIDGE, a citizen of the United States, residing at Atlanta, in the county of Fulton and State of Georgia, have invented new and useful Improvements in Planetary Gearing, of which the following is a specification.

The present invention provides a variable or speed changing gearing, for mechanically propelled vehicles, of the planetary type and of such structure as to admit of three speeds, forward, high, intermediate and low, and a reverse, the construction being such as to insure positive action and a simple arrangement of the parts, whereby replacement may be easily made should occasion necessitate and access readily had to any part for any desired purpose.

The invention consists of the novel features, details of construction and combination of parts, which hereinafter will be more particularly set forth, illustrated in the accompanying drawings, and pointed out in the appended claim.

Figure 1:
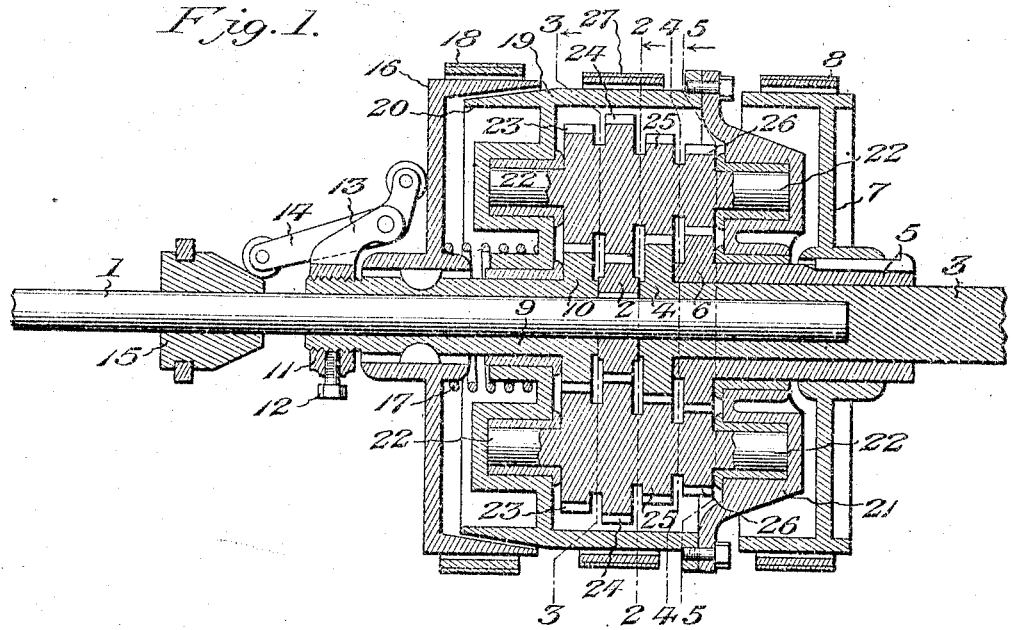
Figure 2:
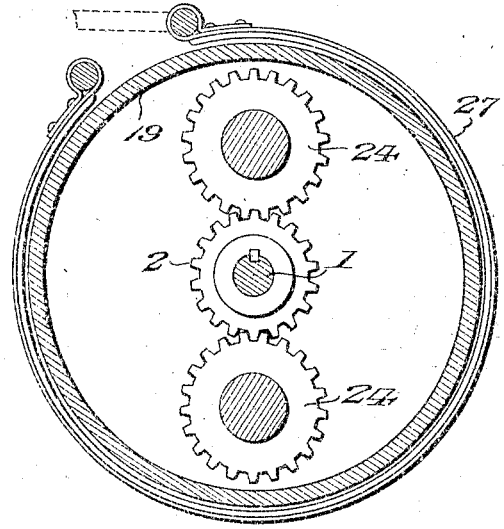
Figure 3:
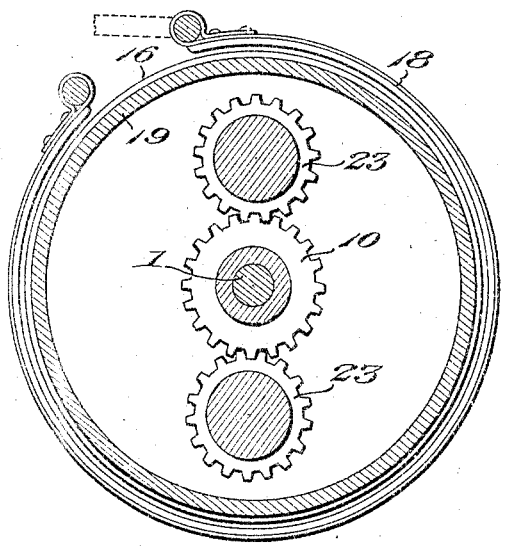
Figure 4:
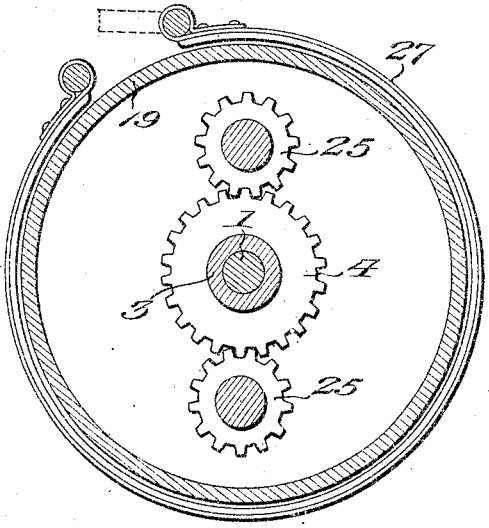
Figure 5:
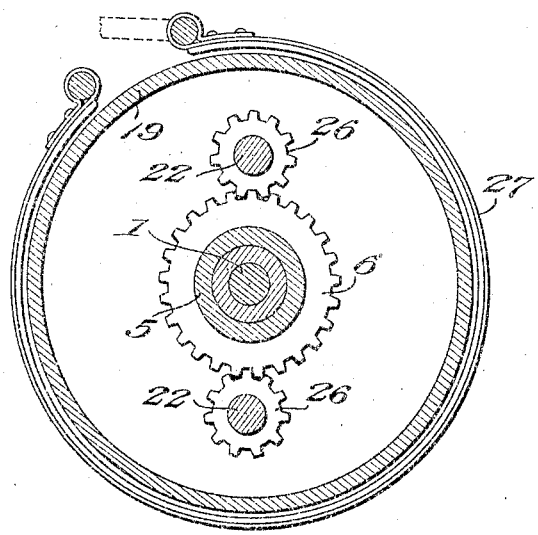

Referring to the drawings, forming a part of the application, Figure 1 is a central longitudinal section of a planetary transmission gearing embodying the invention. Fig. 2 is a transverse section on the line 2—2 of Fig. 1. Fig. 3 is a transverse section on the line 3—3 of Fig. 1. Fig. 4 is a transverse section on the line 4—4 of Fig. 1. Fig. 5 is a cross section on the line 5—5 of Fig. 1.

Corresponding and like parts are referred to in the following description, and indicated in all the views of the drawings, by the same reference characters.

The engine shaft is indicated at 1 and is provided with a gear 2 rotatable therewith. The driving or propeller shaft is designated by the numeral 3 and is provided with a gear 4 rotatable therewith. The end of the driving shaft 3 has an opening to receive an end portion of the engine shaft 1 so as to hold the two shafts in line. A sleeve 5 is loosely mounted upon the driving shaft and has a gear 6 formed with or otherwise applied thereto to turn therewith. A brake member 7 is keyed or otherwise fastened to the sleeve 5 so as to rotate therewith. A brake member 8 is provided to coöperate with the brake member 7 to hold the latter stationary under certain conditions. The brake member 8 preferably consists of a band, which is adapted to be contracted so as to grip the brake member 7 when the latter is to be held stationary. The brake member 7 consists of a disk and a rim at the outer edge of the disk arranged to be gripped by the brake member or band 8. A second sleeve 9 is loose upon the engine shaft 1 and is provided with a gear 10 rotatable therewith. One end of the sleeve 9 is threaded and receives a hub 11, which is threaded thereon and secured in the adjusted position by means of a set screw 12. Arms 13 radiate from the hub 11 and pivotally support bell cranks 14, which are provided at opposite ends with rollers to coöperate with respectively a cone 15 and a clutch member 16, the latter being keyed to the sleeve 9 to turn therewith but free to have a limited longitudinal movement thereon. A spring 17 normally exerts a pressure upon the clutch member 16 to force the same away from the several gear elements. When the cone 15 is moved upon the engine shaft in a direction toward the gearing the bell cranks 14 are operated to press the clutch member 16 toward the gearing, thereby locking the parts and causing the shafts 1 and 3 to rotate together. A brake member 18 coöperates with the clutch member 16 so as to hold the latter against rotation when it is required to reverse the machine.

A drum or casing 19 is loosely mounted upon the sleeves 5 and 9 and has an end portion beveled, as indicated at 20, to form a clutch member to coöperate with the clutch member 16, the latter having the inner side of its rim beveled to match the beveled end portion 20 of the drum or casing. When the clutch member 16 is moved toward the gearing by the action of the bell cranks 14 it grips the beveled end 20 of the drum or casing 9 so as to cause said drum and sleeve 19 to rotate together. One end of the drum 19 is removable, as indicated at 21, so that access may be easily had to the interior of the drum for placing the parts in position or removing them from the drum when required. The spring 17 is interposed between the drum 19 and the clutch member 16 and is supported upon adjacent ends of the hubs thereof. Gears of different diameters are mounted within the drum or casing 19 and mesh with the respective gears 2, 4, 6 and 10. The gears mounted within the drum are provided in sets which are arranged so as to equalize the strain. As shown two sets of gears are provided and have an opposite arrangement, each set of gears being provided upon a shaft 22. Each set comprises gears 23, 24, 25 and 26 and these several gears may be formed together with the shaft 22 or as separate elements and secured to the shaft in any substantial way so as to turn therewith. The gear 26 meshes with the gear 6, the gear 25 with the gear 4, the gear 24 with the gear 2 and the gear 23 with the gear 10. The shafts 22 are suitably mounted within the drum or casing 19 so as to turn about their individual axis. The several gears 23, 24, 25 and 26 are rotatable with their respective shafts 22.

When the engine is in operation it is assumed that the shaft 1 is driven so as to rotate to the right and the gear 2 thereof meshing with the gears 24 rotate the same and the shafts 22 to the left. When the brake member 18 is operated to grip the clutch member 16 the latter is held stationary and also prevents rotation of the sleeve 9 and the gear 10, with the result that the drum or casing 19 is caused to rotate to the left in an opposite direction to the engine shaft. As the drum or casing 19 is driven to the left the gears 25 at the same time mesh with the gear 4 and drive the shaft 3, thereby reversing the machine. By reason of the difference in the diameters of the several coöperating gears it will be understood that the shaft 3 is driven to the left at a slower speed than the drum or casing and at a considerably lower speed than the engine shaft.

Low speed forward is attained by operating the brake member 8, which grips the brake member 7 and holds the same stationary together with the sleeve 5 and gear 6. The drum rotating to the left and carrying the shafts 22 and the gears mounted thereon therewith will cause the shaft 3 to rotate to the right at a slow speed by reason of the difference in diameters of the intermeshing gears 25 and 4 and 26 and 6. The gears 26 are smaller than the gears 25 and the gear 4 is smaller than the gear 6, hence while the drum 19 is turning to the left, together with the shafts 22, the gears 25 by reason of their larger diameter cause the gear 4 to turn to the right.

Upon holding the drum or casing 19 stationary, which may be effected by means of a brake band 27, the shaft 3 may be driven forward at an intermediate speed. The engine shaft 1 it must be remembered is driven to the right and causes the gears 24 and the shafts 22 to turn to the left. When the drum or casing 19 is held stationary rotation of the shafts 22 and the several gears mounted thereon to the left causes rotation of the gear 4 to the right at a higher speed than when the brake member 7 is held stationary. This result is due to the fact that the gears 25 are of a less diameter than the gears 24 and the gear 4 is a larger diameter than the gear 2.

Upon moving the cone 15 so as to operate the bell cranks 14 to cause the clutch 16 to grip the clutch member of the drum or casing 19 the parts are locked and the shafts 1 and 3 rotate together, thereby resulting in high speed forward.

The several brake members 8, 18 and 27 may be mounted in any manner and arranged to be operated by any suitable means such as commonly provided for actuating brake bands. It is to be understood that these brake members are fixed, that is held against rotation but expansible so as to release or to grip the coöperating brake members as may be required to effect the desired result.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In variable speed gearing, the combination of alined engine and driving shafts, a gear wheel secured to the engine shaft, a second gear wheel loose upon the engine shaft and having a sleeve which is threaded at its outer end, a third gear wheel rotatable with the driving shaft, a fourth gear wheel loose upon the driving shaft and having a sleeve, a drum mounted loosely upon the sleeves of the beforementioned second and fourth gear wheels and having an end portion beveled to form a clutch member, a plurality of gear wheels, of different diameters, meshing with the before mentioned gear wheels mounted upon the respective engine and driving shafts and mounted within the drum and rotatable as a unit about a common axis, or with the drum, a brake member secured to the sleeve of the aforesaid fourth gear wheel exterior to the drum, a brake member adapted to engage the last mentioned brake member to hold the fourth gear wheel against rotation, a brake member adapted to engage the drum to hold it against rotation, a clutch member splined to the sleeve of the before mentioned second gear wheel and adapted to engage the clutch member of the drum formed by the beveled end thereof, a spring interposed between the drum and clutch member to normally hold the latter out of action, a brake for engaging the last mentioned clutch member to hold it and the aforesaid second gear wheel from
5 turning, a hub threaded upon the outer end of the sleeve of the before mentioned second gear wheel and having radial arms, bell cranks mounted upon said arms, each having a member engaging the clutch member
10 splined to the sleeve of the said second gear wheel, and a cone loose upon the engine shaft and adapted to engage the other members of the bell cranks.

In testimony whereof I affix my signature in presence of two witnesses.

KENNETH TROWBRIDGE.

Witnesses:
J. A. SCHANNO,
J. P. TOLLERSON.